Figure 1:
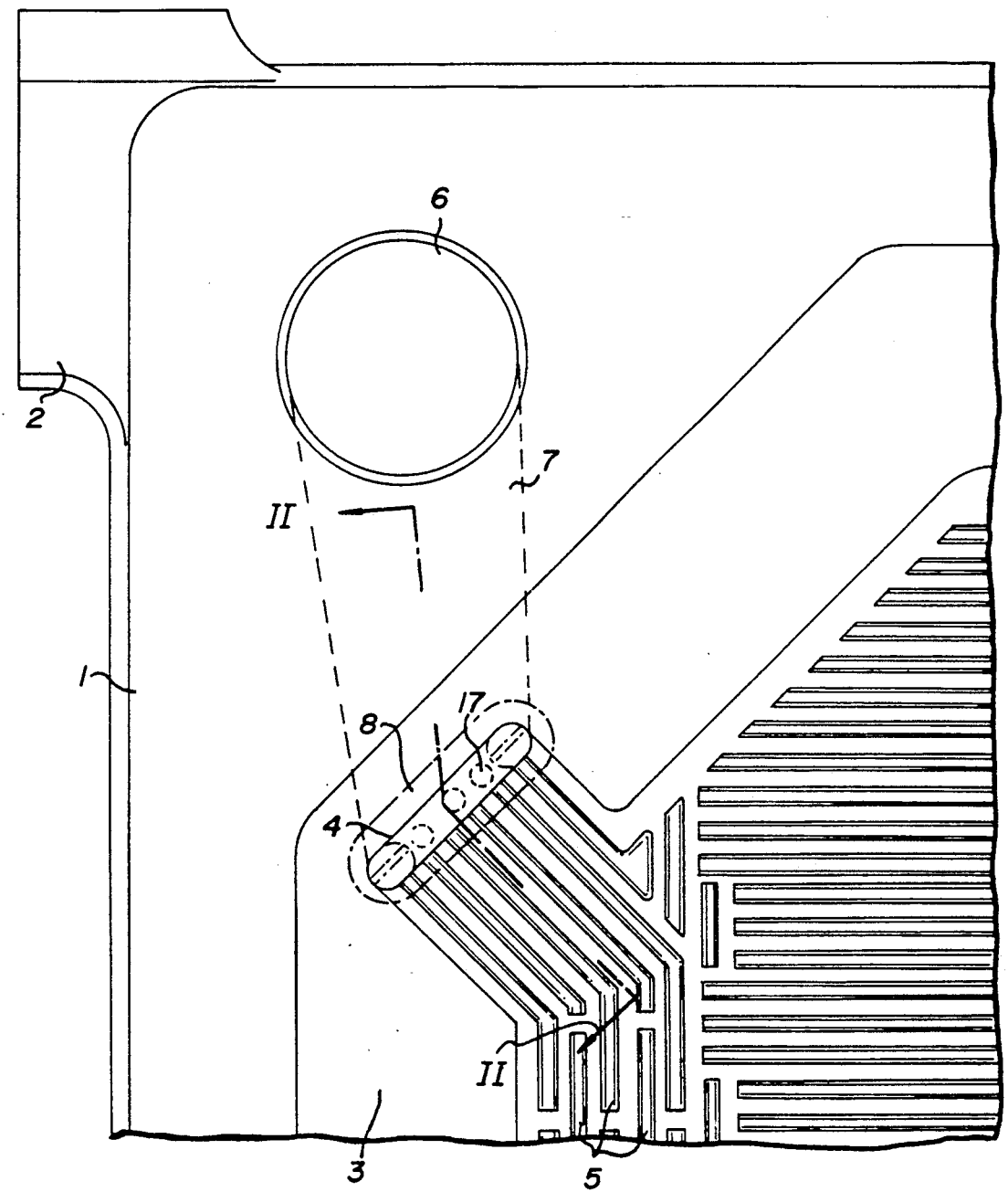

United States Patent [19]

Fresenius

[11] Patent Number: 5,045,191
[45] Date of Patent: Sep. 3, 1991

[54] NON-CLOGGING FILTRATE OUTLET STOPPER FOR USE IN A PLATE FILTER PRESS

[75] Inventor: Jürgen Fresenius, Bad Schwalbach, Fed. Rep. of Germany

[73] Assignee: Passavant-Werke AG, Fed. Rep. of Germany

[21] Appl. No.: 492,102

[22] Filed: Mar. 12, 1990

[30] Foreign Application Priority Data

Mar. 13, 1989 [DE] Fed. Rep. of Germany ... 8903061[U]

[51] Int. Cl.$^5$ ............................................. B01D 25/12
[52] U.S. Cl. ................................... 210/229; 210/231; 210/541
[58] Field of Search ............... 210/227, 228, 229, 231, 210/445, 455, 541; 100/110, 115, 122, 295, 297

[56] References Cited

U.S. PATENT DOCUMENTS

| | | | |
|---|---|---|---|
| 4,235,721 | 11/1980 | Nakamura et al. | 210/227 |
| 4,435,288 | 3/1984 | Miyano | 210/231 |
| 4,826,593 | 3/1989 | Nev | 210/231 |

FOREIGN PATENT DOCUMENTS

| | | | |
|---|---|---|---|
| 99530 | 2/1898 | Fed. Rep. of Germany | 210/229 |
| 6947002 | 12/1969 | Fed. Rep. of Germany | |
| 2947155 | 6/1981 | Fed. Rep. of Germany | |
| 645586 | 11/1950 | United Kingdom | 210/231 |

Primary Examiner—Robert A. Dawson
Assistant Examiner—Matthew O. Savage
Attorney, Agent, or Firm—Larson and Taylor

[57] ABSTRACT

The plate filter press is designed for removing water from product and sewage sludges and includes several filter plates displacably suspended on horizontal carriers. Each of the filter plates includes grooves formed thereon leading to outlet openings located in corners of the plates. The grooves are covered by a filter cloth stiffened by a supporting fabric. Each of the corners further includes a stopper inserted into the outlet opening of the corner with each of stopper provided with a plate-like cover member and a through opening to allow filtrate to pass under the cover member and through the outlet opening. The filter cloth and the supporting fabric are secured in relation to the cover member of the stopper such that, in use, the outlet opening of the plate will remain unclogged.

9 Claims, 2 Drawing Sheets

NON-CLOGGING FILTRATE OUTLET STOPPER FOR USE IN A PLATE FILTER PRESS

DESCRIPTION

The innovation relates to plate filter presses for removing water from product and sewage sludges. The filter plates, which are brought close together during operation, have filter cloths which extend over filtrate discharge ribs disposed on the filter plate. Between the filter cloth and the ribs lies a supporting fabric which is resistant to bending. In the corners of the plates the ribs lead to filtrate outlet openings which are in communication with the discharge ducts lying in alignment over all the plates. It has been found in operation that with increasing filtration pressure the supporting fabric is pressed into these outlet openings. The end outlet slots of the ribs are thus closed, and the discharge of the filtrate is obstructed. Various means have already been adopted to avoid this disadvantage, but with little success. The problem of providing an effective remedy in this connection is now solved in that stoppers which are provided with a plate-like cover member and which have through openings corresponding to the grooving whose open mouths lead into the outlet openings, are inserted into the outlet openings. The stoppers may be closed at the top and thus cover the outlet openings in relation to the supporting fabric. The filtrate can pass unhindered from the grooving into the outlet openings. However, it may also be expedient to provide through openings at the top in order to prevent the stopper from being forced out in the event of filtrate stagnation.

Figure 2:
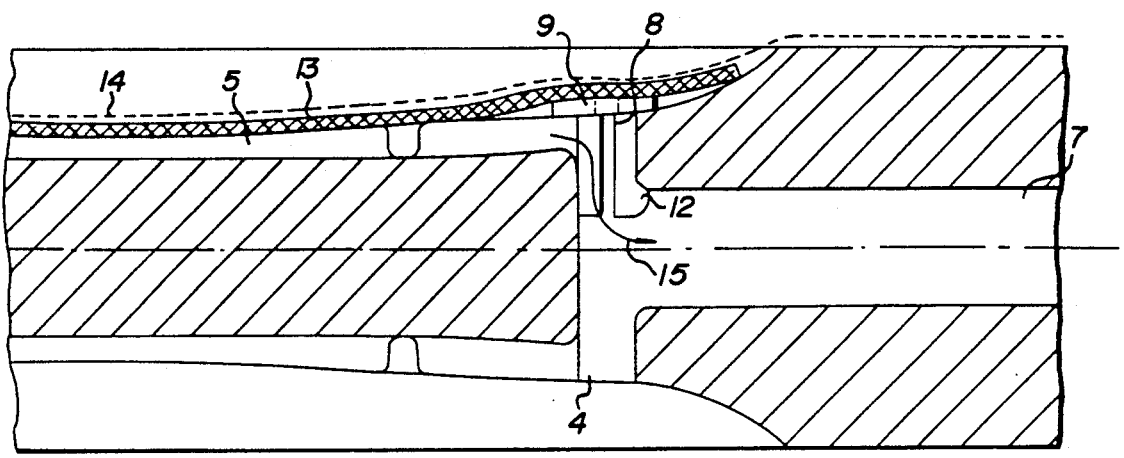
Figure 3:
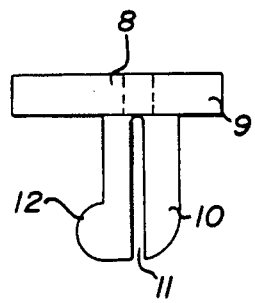
Figure 4:
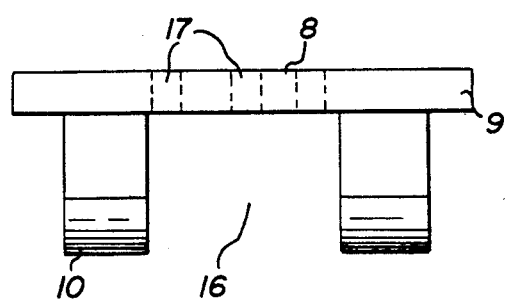

Details of the configuration of the stopper can be seen from the accompanying figures, in which:

FIG. 1 shows the corner of a filter plate in plan view,
FIG. 2 shows the same corner in section,
FIG. 3 is a side view of the stopper, and
FIG. 4 is a front view of the stopper.

The filter plate 1, which, as is usual, is provided with integrally cast lugs 2 for fastening the carriages (not shown), has in the filter chamber 3 a characteristic grooving 5 leading to the filtrate outlet openings 4 at the corners of the plate. As shown in FIGS. 1 and 2, these openings are in communication with the filtrate ducts 6 via flat conduits 7. The grooving has open ends at the longitudinal side of the outlet opening 4. A stopper 8, having a plate like cover member 9, the rim of which is supported on the area around the outlet opening, is inserted into the outlet opening. At the bottom the stopper 8 has two pins 10, which are made elastically resilient by slits 11. The thickening or flange 12 on one side of the pins 10 engages in the conduit 7 and thus secures the stoppers 8. Stopper 8 is preferably constructed from a plastic material.

During operation the supporting fabric 13 and the filter cloth 14 lying over it lie over the grooving 5 and the cover member 9 of the stopper 8, so that the filtrate can flow off (arrow 15) unhindered into the conduit 7, since there is a sufficiently large space 16 between the pins 10.

The top cover of the stopper 8 may be provided with a plurality of discharge openings 17, which will prevent the stoppers from being lifted out in the event of filtrate stagnation.

I claim:

1. In combination, a filter plate of the type suspended on a horizontal carrier with other similar filter plates to form a filter press for removing water from product and sewage sludges, which plate has grooves in its surface leading to outlet openings which in turn lead to filtrate ducts, said grooves being covered by a filter cloth stiffened by a supporting fabric, at least one of the outlet openings including a stopper, said stopper including a plate-like cover member engaging the surface of the filter plate surrounding said outlet opening and therefore prevented from moving into said outlet opening, a pin means connected to and extending downwardly from said cover member into said outlet opening to secure the stopper in place, the stopper including an open area beneath said cover member and adjacent the pin means so as to permit the filtrate to flow from the grooves into and through said outlet opening as said cover member prevents the filter cloth and supporting fabric from moving down into said outlet opening.

2. The combination according to claim 7, wherein said pin means comprises a pair of generally vertical pins extending downwardly from said cover member and engaging opposing ends of said outlet opening, and wherein the open area beneath the cover member includes the space between said pins.

3. The combination of claim 2, wherein each of said pins are slit along the length thereof.

4. The combination of claim 2, wherein each of said pins is provided with a flange being located at an end of the pin remote from the said cover member, said flange extending to an open area laterally offset from the portion of said outlet opening through which the length of the pin extends, so as to prevent the pin means from being removed from said outlet opening.

5. The combination according to claim 1, wherein each of said stoppers is made of a plastic material.

6. The combination of claim 1, including openings in the said cover member connecting the space above the said cover member to the open area beneath the said cover member.

7. The combination of claim 1, wherein each filter plate is generally rectangular and includes outlet openings adjacent each of the four corners thereof.

8. The combination of claim 7, including a said stopper in all four of said outlet openings.

9. The combination of claim 1, including a plurality of said filter plates forming a filter press.

* * * * *